United States Patent [19]

Smith

[11] Patent Number: 4,847,063
[45] Date of Patent: Jul. 11, 1989

[54] HOLLOW COMPOSITE BODY HAVING AN AXIS OF SYMMETRY

[75] Inventor: Jack B. Smith, East Lebanon, Me.

[73] Assignee: Fiber Materials, Inc., Biddeford, Me.

[21] Appl. No.: 127,390

[22] Filed: Dec. 2, 1987

[51] Int. Cl.$^4$ .......................... C01B 31/02
[52] U.S. Cl. .................. 423/445; 423/448; 423/449; 423/461; 87/1; 87/7; 87/9; 87/34
[58] Field of Search ............. 423/445, 448, 449, 461; 252/510, 511; 87/1, 7, 9, 34

[56] References Cited

U.S. PATENT DOCUMENTS

| 3,367,812 | 2/1968 | Watts | 423/448 |
| 3,583,275 | 6/1971 | Duflos | 87/7 |
| 3,917,884 | 11/1975 | Jahn | 423/449 |
| 4,039,341 | 8/1977 | Cooper et al. | 423/449 |
| 4,198,382 | 4/1980 | Matsui | 423/449 |
| 4,278,729 | 7/1981 | Gibson et al. | 428/367 |
| 4,495,231 | 1/1985 | Laskaris et al. | 428/366 |
| 4,519,290 | 5/1985 | Inman et al. | 87/1 |
| 4,684,567 | 8/1987 | Okamoto et al. | 87/1 |

FOREIGN PATENT DOCUMENTS

| 47-49992 | 12/1972 | Japan | 423/448 |
| 59-174510 | 10/1984 | Japan | 423/448 |

Primary Examiner—John Doll
Assistant Examiner—Robert M. Kunemund
Attorney, Agent, or Firm—Schiller, Pandiscio & Kusmer

[57] ABSTRACT

Method of forming a hollow, carbon/carbon composite article around an axis of symmetry, in which method a heat refractory mandrel is shaped to provide a desired inner surface configuration and tolerances of the article, and one or more plies of thermally stable carbon filaments are braided over the surface of the mandrel. The filaments have a diameter of substantially not greater than about 6 microns and a modulus of elasticity of substantially not less than about $45 \times 10^6$ psi. The plies are then impregnated with a carbonizable liquid impregnant, and the assembly of impregnated plies and mandrel is heat treated so as to carbonize the impregnant. The resulting composite article has a high translation of the original strength of the filaments and has an inner surface defined by the outer surface of the mandrel.

18 Claims, 1 Drawing Sheet

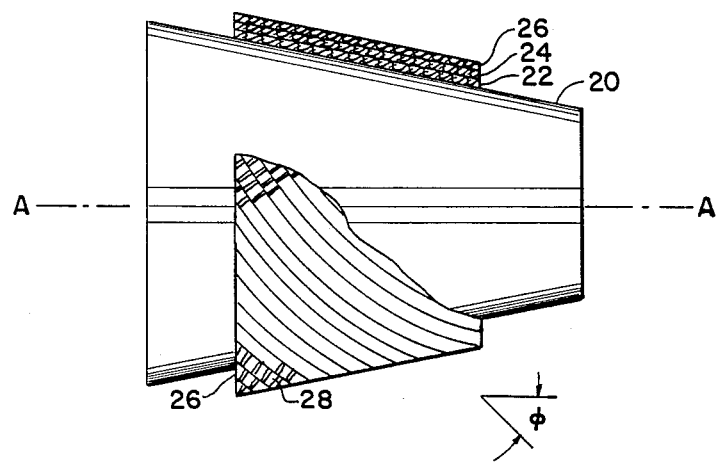

HOLLOW COMPOSITE BODY HAVING AN AXIS OF SYMMETRY

This invention relates to composite materials, and more particularly to light weight, high-strength, articles of composite materials shaped around an axis of symmetry.

Composite material, i.e. material formed of fibers of high tensile strength embedded in a matrix with a high modulus of elasticity, have become particularly important in a number of areas such as the aerospace industry. Specifically, carbon/carbon composites having an axis of symmetry have found use in missile nose cones, nozzles exit cones and other environments where light weight yet highly refractory properties are desirable. The term "having an axis of symmetry" as used herein is intended to apply not only to bodies that are bilaterally symmetrical such as bodies of revolution (e.g. cylinders, cones and the like) but such bodies having non-circular cross-sections orthogonal to the axis of symmetry (e.g. oblate, oval, trapezoidal and the like), and specifically also to apply to articles and bodies of revolution in which other densified carbon bodies are or may be incorporated.

One method of forming such bodies from composites involves extruding or molding a mixture of reinforcing fibers or filaments and a carbonaceous binder. After curing the binder, the body is heated to a temperature sufficient to carbonize the binder and/or filaments. An obvious disadvantage of this process is that the body formed tends to be too heavy for man applications, and manufacturing control of the wall thickness and the density of the body is difficult.

In another conventional method of fabrication of carbon/carbon components with an axis of symmetry typically one lays up plies of fabric on a mandrel, reiteratively impregnates the lay up with a liquid impregnant that will carbonize when heated sufficiently, and carbonizes the impregnated lay up. However, since many high modulus fibers, including carbon fibers, tend to be very brittle, hard to handle and often difficult to weave directly into cloth, the fabric is frequently first woven from a carbonaceous fiber precursor, such as polyacrylonitrile (PAN), and the fabric itself is then subsequently carbonized. Such a method of fabrication of a composite body requires exacting care in stacking the plies and applying binder if one wishes to avoid undesirable variations in wall thicknesses. It should be noted that high modulus fibers have been used in making preforms that are subsequently densified to produce composite bodies, but such use has been primarily to reduce or minimize cracking during the heat treatment in producing the final product.

Another known method of forming carbon/carbon bodies about an axis of symmetry involve winding fibers, in the form of filaments, yarns, tapes or felts and preferably in a carbonized form, about a mandrel. The fiber form is impregnated, either before or after winding, with a binder under pressure, cured and then carbonized, for example as taught in U.S. Pat. No. 3,917,884.

Yet another method of forming carbon/carbon bodies about an axis of symmetry involves weaving carbon fibers over a mandrel in polar coordinates to produce a preform. The preform is impregnated with binder and the latter is subsequently carbonized. Polar coordinate weaving is subject to many of the general problems noted above regarding weaving with high modulus fibers.

These prior art methods frequently involve incorporation of overstock or selvage material that must be removed, usually by machining, to achieve the final desired configuration. Such machining inevitably cuts or interrupts the reinforcing carbon fibers within the composite, impairing strength and modulus while amplifying the effects of small distortions. Particularly, where the desired article is a body of revolution, in whole or in part, about an axis of symmetry (e.g. a rocket exit nozzle), machining rotation may be crucial. If the fiber axes are not properly aligned with respect to the face of the cutting tool, the fibers may bunch and unwrap or be torn apart. Even with proper alignment, too deep a machining cut will create a similar problem.

Typically, during densification (one or more cycles of impregnation with a binder followed by corresponding carbonization) of carbon/carbon articles formed according to the prior art, small deformations either in expansion or contraction may occur due to thermal or chemical changes in the carbon fibers or mismatches between the coefficient of expansion of the carbon matrix and the fibers.

Still another method of forming carbon/carbon bodies around an axis of symmetry employs braiding techniques. Braiding is an ancient textile process of interconnecting fibers to produce a web in which the fibers are oriented symmetrically about an axis. Following braiding, the articles can then be densified by the usual techniques. In a biaxial braid, the fibers are oriented at angles of $+\phi$ and $-\phi$ to the braid axis, the angle being either fixed or variable. A triaxial braid employs a third fiber axis oriented parallel to the braid axis. A biaxially braided web can be easily made to conform to various contours of a surface, but a triaxially braided web cannot be molded to other shapes but must be braided onto a form or mandrel in the desired net shape. Braiding machines capable of mechanically forming biaxial and triaxial braids from carbon fibers are commercially available in the United States from such companies as Rockwell International and New England Butt/Wardell in Rhode Island.

A primary object of the present invention is to provide a process for manufacturing hollow bodies of composite materials around an axis of symmetry, which process overcomes the problems of the prior art above indicated. Yet other objects of the present invention are to provide such a process in which the a hollow body is braided from thermally stable carbon filaments of high modulus of elasticity to a desired or final (i.e. net shape) over a mandrel and subsequently densified, thereby permitting one to form a highly stable body with no machining required; to provide such a process in which the thermally stable filaments are less than about six microns in average diameter; to provide such a process in which the braiding and densification steps are accomplished using the same mandrel; and to provide a light-weight, strong, hollow body formed of a carbon/carbon composite relatively inexpensively and with high precision. Yet other objects of the present invention will in part appear obvious and will in part appear hereinafter.

The invention accordingly comprises the processes and the several steps and relation of one or more of such steps with respect to each of the others, and the product possessing the feature, properties and relation of elements which are exemplified in the following detailed disclosure and the scope of the application of which will be indicated in the claims.

Generally, to effect the foregoing and other objects, the present invention provides a carbon/carbon reinforced composite material formed of a carbonized matrix containing one or more plies of braided, elongated carbon filaments, such filaments being very high modulus carbon with average diameters of six microns or less. Such material is produced by a process that generally involves the steps of braiding one or more plies in successive layers about male tooling of predetermined shape to form a dry preform, such tooling being formed of a thermally refractory material, cyclically impregnating the dry preform on the tooling with a resin and carbonizing the preform following each impregnation.

For a fuller understanding of the nature and objects of the present invention, reference should be had to the following detailed description taken in connection with the accompanying drawing wherein there is shown a schematic diagram of a mandrel of the present invention with a braided preform mounted thereon, shown partially in cross section and partially cut away.

The process of the present invention is preferably carried out by first fabricating by any conventional technique, a male mandrel to the specific desired inner surface configuration and tolerances of the final product. The mandrel is preferably formed of a thermally refractory material such as graphite, metal, ceramic or high-temperature polymers such as polytetrafluoroethylene. Where the mandrel is metal, graphite or ceramic, it is preferred to precoat the mandrel with a release agent to permit ready removal of the mandrel from the preform subsequently formed on it. No release agent is necessary when using a polytetrafluorethylene mandrel. Often one may also form a metal mandrel so that is can include pre-made graphitic portions that will become incorporated into the final product as described hereinafter.

After the mandrel has been fabricated and coated, if necessary, it is then mounted on a conventional braider, and a desired number of plies of a biaxial or a triaxial braid of tows of carbon (preferably graphite) fibers or filaments are then formed over the mandrel. The fibers used for the braiding step are thermally stable, continuous monofilaments typically formed from polyacrylonitrile (PAN) precursor fibers. Importantly, such filaments are high modulus (e.g. $45 \times 10^6$ psi or greater), graphitized (at 2200° C. or greater) filaments that are about six microns or less in average diameter. These PAN filaments enable the braided structure to remain dimensionally stable throughout subsequent heat treatment of the preform. It will therefore be seen that each ply is very thin, being not substantially more than about 12 mils thick, and preferably less than about 6 mils thick. If triaxial braiding is used, each ply is staggered with respect to its underlying ply (i.e. the axial fibers are shifted by a small radial angle with respect to the underlying layer of axial fibers, thereby allowing the plies to nest without building up large axial ridges.

For exemplary purposes, mandrel 20 is shown in the drawing as a conical element such as the frustum of a cone having an axis of symmetry (e.g rotation in this case) A—A, but it is to be understood that the mandrel can take many other shapes that may be regular such as cylinders or irregular such an hollow having a pear-shaped cross section and the like. A plurality of plies 22, 24 and 26 braided from filaments 28 are shown in biaxial braided form around mandrel 20, it being understood that the thickness of the plies and the width and separation of the braided filaments are all exaggerated for clarity in illustration. Top ply 26 illustrates a typically braid construction in which the braid angle, $\phi$, of filaments 28 is shown with respect to the axis A—A. The article of the present invention can be formed so that some or all of the plies were a triaxial braid, and in such case each triaxially braided ply would thus further include a plurality of equispaced axial reinforcing filaments parallel to the mandrel surface.

Following braiding of one or more plies over the mandrel until the net shape is formed with the desired structural properties and thickness, the preform is impregnated with a carbonizable liquid impregnant. Typically, a number of known impregnants capable of being carbonized may be used, e.g. high char yield phenolic resins, isomeric polyphenylene, coal tar pitch, parapolyphenylene, polyimides, mixtures of aldehydes and phenols such as furfural and resorcinol and the like. It will be apparent that the inner surface of the preform will be defined by the mandrel surface. Following impregnation of the preform, the outer surface is preferably wiped or doctored to remove excess impregnant. The thickness of the wall thus formed is of course determined by the number of plies as well as the diameter of the filament used for braiding.

The saturated preform is cured and the assembly carbonized and graphitized by techniques and at temperatures and pressures well known in the art. A series of subsequent impregnation and carbonization steps may be added to increase the density of the final product, if desired. The same mandrel is used for each such impregnation step to insure that the inner surface of the finished article will conform as closely as possible to the mandrel shape and surface texture. Importantly, the use of heat stabilized fibers to form the braided preform, together with the use of the mandrel during at least initial carbonization of the product, insures that the structure will remain dimensionally stable during fabrication despite the large thermal gradients experienced in the process.

The following examples illustrate the process for forming the composite article of the present invention, are presented solely for illustration and should not be interpreted as limiting.

EXAMPLE I

A male metal mandrel of aluminum is prepared is the desired shape and size by conventional machining to provide the specifically desired inner surface configuration and tolerance for the final product. The completed mandrel is then coated with a release agent to facilitate removal of the intact mandrel after the initial densification step. To this end, five spray coats of a commercially available release agent (Mono Coat E63 from Chem Trendo, Inc.) are applied to the mandrel followed by one hour heat conditioning at about 165° C. Alternatively, if the mandrel is formed of polytetrafluorethylene, no release agent is needed. The mandrel is then mounted on a conventional triaxial braider.

The braider is loaded with creels of tows of carbonized filaments of about 5 microns in diameter, the filaments having been formed from a precursor (e.g. Apollo 55 PAN fiber) carbonized and heat stabilized at approximately 2500° C. as well known in the prior art. A preform is then produced by triaxially braiding a desired number of plies around the mandrel to achieve the desired thickness. The small diameter carbon fibers permit one to form very thin plies, typically about 6 to 12 mils in thickness. Each ply is staggered (i.e. braided with the axial filaments angularly shifted a few degrees from ply to ply), to allow nesting of the axial filaments. To this end, using a 64 braid carrier that introduces 32 equiangularly spaced axial reinforcement filaments into each ply of the preform, the axial filaments of each ply are angularly shifted by 11.25° in either direction with respect to immediately adjacent plies.

Following completion of braiding, the mandrel and braided assembly are removed from the braider and the assembly is sprayed with an impregnant that is 67 wt % furfural and 33 wt % resorcinol in amount sufficient to saturate the preform, and excess impregnant is wiped gently from the surface of the preform. The wiped saturated preform is then placed in an oven and cured at about 165° C. for one hour, the metal mandrel then removed and the cured, impregnated preform is carbonized in an argon environment by heating to 800° C. and held for one hour. Following carbonization, the carbonized preform is allowed to cool, and reimpregnated on the mandrel again and again carbonized through an additional number of similar cycles until a desired density preferably not less than 1.35 gm/cc is achieved. The preform is then removed from the mandrel as the finished product.

EXAMPLE II

A mandrel of the desired surface configuration and tolerances is formed by machining a graphite block, the mandrel is treated with a release agent, and the desired number of plies of heat stabilized, 5 micron diameter carbon filament is braided over the mandrel as described in Example I. The braided preform is impregnated and carbonized as described in Example I and the entire assembly, including the mandrel is then heat treated in an induction furnace under nitrogen to 2500° C. for one hour to graphitize the preform. Additional steps of reimpregnating and reheating the assembly to carbonization temperatures are conducted until the preform has reached the desired density.

EXAMPLE III

A mandrel is formed by machining steel to the desired shape with appropriate spaces for shaped inserts in the mandrel surface. Inlays or inserts of densified carbon/carbon (e.g. 1.9 gm/cc) are appropriately formed and machined so as to be fitted into the spaces in the steel mandrel surface, thereby forming a multicomponent mandrel. Of course, the design of the mandrel has to be such that a preform with the inserts attached thereto can be readily released from the mandrel subsequently, as by sliding it off the latter. Only the metal portion of the mandrel surface is treated with a release agent (Release All #30 from Air Tek International), and the mandrel conditioned in an oven at about 160° C. for an hour.

The conditioned mandrel is then mounted in a braider and, as in Example I, a sequence of plies of small diameter, heat-stabilized, high modulus carbon filament braided over the mandrel to provide the desired preform. The latter is then saturated with an appropriate impregnant, making sure that impregnant fills the interstices of the braid immediately adjacent each of the carbon/carbon inserts. The preform/mandrel assembly is subjected to heat treatment as in Example I. Additional cycles of densification are repeated until the final product has the desired density. After the carbonization cycles have been completed, the preform is removed from the mandrel with the inserts integrally bonded to and aligned along the interior of the braided portion of the preform.

It will be seen that the invention provides a process that creates dimensionally stable, thin walled, carbon/carbon, net shape composites having an axis of symmetry. The process permits one to create such net shapes with wall thicknesses as small as 20 mil inches (0.02") without machining, thereby greatly reducing the associated component weight without impairing the fundamental strength of the high modulus fibers. The process of the present invention also permits ready and accurate reproducibility of a particular net shaped carbon/carbon article, with a net surface finish both inside and outside of the article. Lastly, because the process of the present invention also provides a technique for accurately preassembling, aligning and bonding high density carbon/carbon elements to the preform, many problems of nozzle or exit cone attachment and alignment are overcome.

Since certain changes may be made in the above process and articles of manufacture without departing from the scope of the invention herein involved, it is intended that all matter contained in the above description shall be interpreted in an illustrative and not in a limiting sense.

What is claimed is:

1. A method of forming a hollow carbon/carbon composite article around an axis of symmetry, said method comprising the steps of:
   shaping a surface of a heat refractory mandrel to the desired inner surface configuration and tolerances of said article;
   covering said surface of said mandrel with one or more plies of thermally stable carbon filaments having diameters of substantially not greater than about 6 microns and a modulus of elasticity of substantially not less than about $45 \times 10^6$ psi;
   impregnating said plies with a carbonizable impregnant while on said mandrel; and
   heat treating the assembly of said impregnated plies so as to carbonize said impregnant. said surface and said assembly being releasable intact from one another.

2. A method as defined in claim 1 including the steps of reimpregnating said assembly with additional impregnant and carbonizing said reimpregnated assembly cyclically until a desired density of carbon/carbon is reached.

3. A method as defined in claim 1 wherein said step of covering is effected by triaxially braiding said filaments.

4. A method as defined in claim 1 wherein said step of covering is effected by biaxially braiding said filaments.

5. A method as defined in claim 1 wherein said impregnant is a mixture of aldehyde and phenol.

6. A method as defined in claim 1 wherein the step of impregnating includes saturating said plies with impregnant.

7. A method as defined in claim 1 wherein said mandrel is formed of metal, ceramic or graphite.

8. A method as defined in claim 7 including the step of treating the surface of said mandrel with a release agent prior to braiding said plies on said mandrel.

9. A method as defined in claim 1 wherein said surface of said mandrel is formed in part of metal and in part of graphite, and including the step of treating only the metallic portions of said surface with a release agent prior to braiding said plies on said mandrel.

10. A method as defined in claim 1 wherein said mandrel is formed of polytetrafluorethylene.

11. A method as defined in claim 1 wherein said mandrel is formed of graphite and the step of heat treating said assembly is carried out at a temperature at which said impregnant will graphitize.

12. A method as defined in claim 3 including the step of angularly shifting, during braiding, the position of axial filaments in each said ply with respect to the corresponding axial filaments in each immediately adjacent ply.

13. A hollow, composite carbon/carbon article having an axis of symmetry, said article comprising:
   a plurality of successive plies of carbon filaments embedded in a carbonized matrix, said filaments being heat stabilized, having a diameter of less than about 6 microns and having a modulus of elasticity of substantially not less than $45 \times 10^6$ psi;
   the inner surface of said article being established by the surface of a mandrel on which said plies were originally placed.

14. A hollow, composite article as defined in claim 13 having a density of not less than 1.35 gm/cc.

15. A hollow, composite article as defined in claim 13 including elements of carbon/carbon material bonded to the interior surface of said article by the material of said matrix, said elements having a higher density than the density of said plies and matrix.

16. A hollow, composite article as defined in claim 13 and having a wall thickness of as small as 20 mil inches.

17. A hollow, composite article as defined in claim 13 and having a substantially conical form.

18. A hollow, composite article as defined in claim 13 wherein said carbon filaments are braided together.

* * * * *